July 28, 1970  J. E. BRIDEGUM  3,521,704

HEAT EXCHANGER FOR RECREATIONAL VEHICLE

Filed July 22, 1968

INVENTOR:
JAMES EARL BRIDEGUM
BY
Elliott & Pastoriza
ATTORNEYS

United States Patent Office 3,521,704
Patented July 28, 1970

3,521,704
HEAT EXCHANGER FOR RECREATIONAL VEHICLE
James Earl Bridegum, Granada Hills, Calif., assignor of fifty percent to Andrew Morris Anderson, Ventura, Calif.
Filed July 22, 1968, Ser. No. 746,448
Int. Cl. F28f 11/00
U.S. Cl. 165—70    4 Claims

ABSTRACT OF THE DISCLOSURE

A heat exchanger is arranged to interconnect the radiator water circuit of a recreational vehicle and the domestic water circuit of the vehicle's plumbing system. The heat exchanger extracts thermal energy from the radiator water to heat the domestic water and simultaneously allows the radiator water to become cooled. Radiator water leaks likely to contaminate the domestic water are detected so that potential harm to the consumers is eliminated.

---

The present invention relates to a vehicle heat exchange system and more specifically to a heat exchange system for simultaneously heating domestic water and cooling vehicle radiator water.

BACKGROUND OF THE INVENTION

The concept of using the circulating radiator water of a recreational vehicle as a thermal energy source to heat domestic water is known. Some presently operated motor homes and campers link together the radiator water circuit and domestic water circuit so that as the domestic water absorbs heat from the radiator water, then the radiator water automatically becomes cooled.

However, when the radiator water and domestic water circuits are integrated in this manner, a potentially serious health hazard arises. Consumers of the domestic water are constantly exposed to the possibility of having contaminated radiator water seep or leak into the domestic water. Thus far it has been impossible to isolate the domestic water and radiator water circuits and still safely take advantage of the heat exchange relationship.

Various responsible governmental and certifying groups that establish exacting plumbing safety standards routinely refuse to approve presently employed vehicle heat exchange systems because they are inherently incapable of providing adequate safety for the consumer's health. One cause tending to promote the leakage of radiator water into the domestic water is that the customary copper tubing for conducting the radiator water gradually erodes and deteriorates upon prolonged exposure to antifreeze solutions and other radiator water additives. When the tube becomes ruptured, radiator water leaks through the tube and becomes mixed with the domestic water. Safe plumbing practices aimed at guaranteeing wholesome water demand that this type of situation be prevented.

Another drawback of conventional vehicle heat exchange systems in campers for example, is that when the camper is replenishing its depleted domestic water supply and an undetected leak has occurred then the mixed liquid may backflow into the community water supply. Those who administer the plumbing codes are especially vigilant of this danger source and disapprove such proposed vehicle heat exchange systems. Otherwise the serious deficiencies might eventually harm numerous people.

BRIEF SUMMARY OF THE INVENTION

Briefly stated, the present invention comprehends a heat exchange system for simultaneously heating potable liquid from a potable liquid source, such as a potable water supply incorporated in a recreational vehicle plumbing system, and cooling relatively warmer nonpotable liquid from a nonpotable liquid source such as a vehicle radiator water system. A first flow line for conducting potable liquid and a second flow line for conducting nonpotable liquid are isolated from one another by a partition means that is coupled in heat exchange relationship with the first flow line. The partition means defines a hollow section for containing a nontoxic heat transfer liquid that surrounds a segment of the second or radiator flow line.

Leak detection means preferably in the form of an overflow outlet connected to the partition means is arranged to detect leakages of potable or radiator liquid into the heat transfer liquid. The first flow line includes a potable liquid inlet and a potable liquid exit located above the inlet so that potable liquid heated by the heat transfer liquid will rise to the potable liquid exit. An overflow tube is connected to the overflow outlet and has a top section positioned sufficiently beneath the potable liquid exit so that if potable liquid becomes unpressurized and the partition means ruptures, then the heat transfer liquid is prevented from flowing into the potable liquid and backflowing through the potable liquid inlet.

The tank or enlarged cavity constitutes a part of the potable liquid circuit. In accordance with one construction of the present invention the partition means is inserted into the tank and is at least partially immersible in the potable water, and, in accordance with another construction, the partition means is connected to an outside wall portion of the tank so that heat may be transferred through the tank wall to the potable liquid.

The heat transfer liquid is less dense than water and therefore leakages of potable or radiator water into the heat transfer liquid displaces and flushes the latter through the overflow tube. A vehicle occupant will be alerted to radiator water leaks by observing the engine overheating indicator and to potable water leaks by detecting little or no hot water pressure when a conventional faucet or valve is turned on.

BRIEF DESCRIPTION OF THE DRAWINGS

The numerous benefits and unique aspects of the present invention will be fully understood when the following detailed description is studied in conjunction with the drawings in which.

DETAILED DESCRIPTION OF THE PREFERRED EMBODIMENTS

Figure 1:
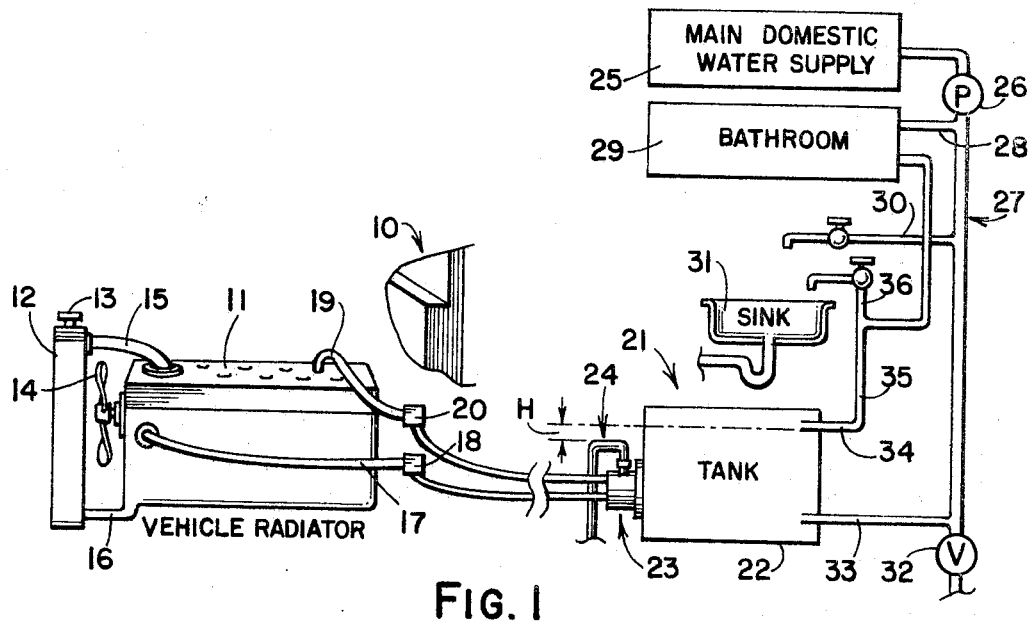
FIG. 1 is a schematic view showing a vehicle radiator circuit interconnected with a typical recreational vehicle plumbing system by the heat exchanger of the present invention.

Referring first to FIG. 1, there is shown a firewall 10 or other support partition incorporated in a recreational vehicle such as a motor home, camper or pleasure boat. The vehicle includes a customary engine block 11 and radiator 12 that may be filled with water and various chemical compounds such as antifreeze not fit for human consumption when a radiator cap 13 is removed. A conventional fan 14 is mounted to the forward wall of engine block 11. A supply hose 15 conducts radiator water into a manifold within engine block 11 and a return hose 16 returns heated water from block 11 to radiator 12.

A flow line for circulating radiator water includes a radiator exit flow line 17 having sections that may be disconnected by an intermediate coupling 18, and, a radiator inlet flow line 19 having a similar intermediate coupling 20 for disconnecting segments of line 19. Lines 17 and 19 are arranged to circulate radiator liquid through a portion of a heat exchange system 21. Heat exchange system 21 includes a tank 22 which mounts a heat exchange unit 23 coupled to a leak detection means 24.

Heat exchange system 21, as shall be fully explained, interconnects the radiator water circuit with the vehicle plumbing circuit which conducts domestic or potable water suitable for cleansing and human consumption Potable water from a main supply domestic water tank 25 is channeled by a pump or compressor 26 through a main flow line 27. Extending from main flow line 27 is a first cold water branch line 28 leading to a bathroom 29 and a second cold water branch line 30 leading to a sink 31 which may be located in the vehicle kitchen, bathroom or any other convenient location. Potable water flowing downstream of line 30 may be discharged through a drain valve 32 or through a flow line 33 to tank 22. Extending from the top part of tank 22 is a tank exit flow line 34 for supplying heated water to a riser 35. From riser 35 heated water may be supplied to sink 31 through line 36 and/or bathroom 29 through another line 37.

Figure 2:
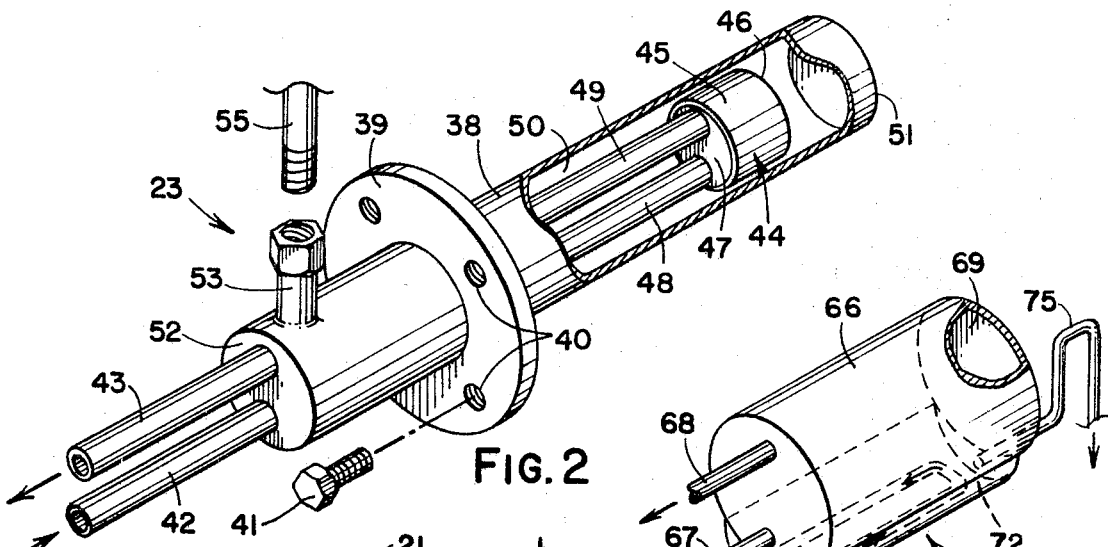
FIG. 2 is a perspective, partially sectional view showing a first embodiment of the heat exchange unit arranged to assist in simultaneously cooling radiator water while heating domestic water.

FIG. 2 illustrates the important details of the heat exchange unit 23 capable of being used in an environment such as that described in conjunction with FIG. 1. Unit 23 includes partition means in the form of an elongated tube 38. Mounted to an intermediate section of tube 38 is an annular mounting flange 39 formed with circularly aligned apertures 40 through which bolts 41 may extend to secure unit 23 to the tank wall as shown in FIG. 1. Extending from an external location into tube 38 is a tubular inlet portion 42 for conducting nonpotable liquid such as radiator water. Aligned in coextensive relationship with inlet tube 42 is an exit tube 43 for removing radiator water from elongated tube 38. Portions of tubes 42 and 43 together with a reverse bend portion 44 constitute a segment of the radiator water circuit. Reverse bend portion 44 is characterized by a cup 45 having a bottom 46 and top 47. Bottom 46 is spaced from the inner ends 48 and 49 of tubes 42 and 43 respectively while top 47 is apertured to retain ends 48 and 49 so that tubes 42 and 43 are laterally separated from one another.

The partition means or elongated tube 38 defines a hollow section 50 and has a closed inner end 51 and closed outer end 52 apertured to securely retain tubes 42 and 43. Hollow section 50 contains a nontoxic heat transfer liquid 50' such as any suitable pure white mineral oil for a purpose to be described. The heat transfer liquid or oil 50' completely surrounds the portions of tubes 42 and 43 and reverse bend portion 44 that together constitute a segment of the radiator water circuit. Preferably oil 50' is less dense than water so it can be easily displaced by water for a purpose to be described. Extending outwardly from tube 38 is an overflow outlet 53 terminating in a nozzle 54 that is internally threaded for making a tight leakproof connection with an overflow tube 55. The purpose of this arrangement shall be fully explained.

Figure 3:
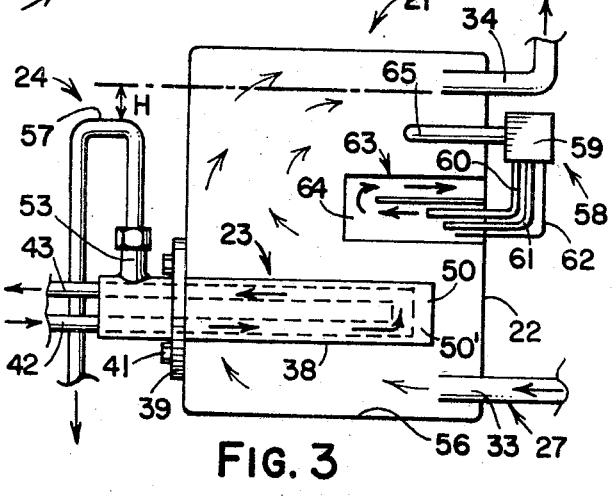
FIG. 3 is a schematic view showing an arrangement of the heat unit of FIG. 2 during heat exchange conditions; and, FIG. 4 is a perspective view showing a second embodiment of the heat exchanger.

Referring now to FIG. 3 for a more complete understanding of heat exchange system 21, it can be seen that tank 22 defines an enlarged cavity 56 which together with tank inlet line 33 and tank exit line 34 constitutes a part of the main domestic water flow line 27. Heat exchange unit 23 is mounted by flange 39 and bolts 41 to a wall of tank 22. Overflow tube 55 extends upwardly from overflow outlet 53 and has a top portion 57 whose maximum level is spaced beneath potable liquid exit 34 by a distance H.

Installed in one side of tank 22 is a gas water heater 58 which, as shall be explained, may be operated to heat the potable liquid when the vehicle engine is not running. Heater 58 which may be a conventional propane heater includes the usual controls 59, main gas supply tube 60, pilot gas tube 61 and thermocouple 62 for sensing the presence of a pilot light. A flue box 63 defines a flue passageway 64 through which heated gas is forced to heat the surrounding domestic water. A heat sensitive sensor 65 is inserted in the domestic water so that when the water is heated to a predetermined temperature, it can cause operation of gas heater 58 to be discontinued.

OPERATION OF THE FIRST EMBODIMENT

Keeping the above construction in mind, it can now be understood how many of the previously described disadvantages of prior art vehicle heat exchange systems are overcome or substantially eliminated by this embodiment of the present invention.

When the recreational vehicle motor is running, circulating radiator water will pass through inlet tube 42, follow a tortuous path, and then exit through tube 43 during which time thermal energy from the radiator water will be extracted by the heat transfer liquid 50'. Simultaneously relatively cooler domestic water contained in tank 22 will absorb heat from heat transfer liquid 50' and elongated tube 38. Heated domestic water will rise within tank 22 and egress through exit flow line 34 upon demand by a consumer. As the domestic water acquires thermal energy from the radiator water, through the medium of nontoxic heat exchange liquid 50' the radiator water necessarily becomes cooler. The relatively cooled radiator water is recirculated through the vehicle engine to improve its operating efficiency in the usual manner.

If the segment of the radiator water circuit surrounded by hollow section 50 develops a leak, the risk of toxic radiator water contaminating the domestic water line is eliminated by the present invention. If such a leakage occurs, the less dense heat transfer liquid will become displaced by the radiator water through overflow outlet 53 and overflow tube 55. As the radiator water is drained away, the vehicle driver will immediately notice flickering or the like on a conventional vehicle dashboard gauge. Such signalling will indicate that the engine temperature has increased to a danger zone and the driver thereby will become alerted to the danger and commence remedial efforts. Optionally, line 55 could be coupled to an alarm system capable of being triggered by the presence of liquid or a predetermined weight.

Under ordinary circumstances when the domestic water in tank 22 remains pressurized, if tube 38 ruptures the pressurized domestic water will quickly displace the lighter heat transfer liquid and flush it outwardly through overflow tube 55. Heat transfer liquid 50' will be quickly emptied from hollow section 50 by the pressurized domestic water and also because of the fact that the heat transfer liquid is lighter than water. The constant bleeding away of the domestic water will result in gradual diminished pressurization of the domestic water and a consumer will accordingly become aware of the leakage condition upon opening a hot water valve and detecting little or no water pressure. Also an optional alarm system responsive to leaks could be employed, as has been previously mentioned.

The various additional safety purposes for maintaining tank exit 34 at a height H above overflow tube top 57 will now be explained. If overflow tube top 57 were positioned above exit 34 and the domestic water became unpressurized then a leakage opening in tube 38 might permit mixture of the heat transfer liquid and domestic water, a slug of which mixture could be withdrawn through exit 34 and consumed. Notwithstanding the fact that the heat transfer liquid is nontoxic and less dense than water it is conceivable that an overcautious certifying group might withhold product approval on grounds that over a lengthy period of time the heat transfer liquid might become stale and decompose. Therefore even the possibility of a trace becoming mixed in the domestic water would be objectionable. This possible grounds of objection is eliminated by arranging overflow tube top 57 below exit 34 so that if this type of leak occurs, the domestic water level will descend to a level equivalent with that of overflow tube top 57. As a result, no liquid will be permitted to egress through exit 34.

Another important safety feature made possible by arranging overflow tube top 57 below exit 34 becomes realized in the remote event that contemporaneously; (1) the domestic water becomes unpressurized, (2) tube 38 becomes ruptured and, (3) the vehicle main domestic water supply tank 25 is being replenished. In this situation an unexpected liquid surge might cause the water within tank 22 to backflow outwardly through entrance 33 and into the community water supply. This condition is prevented because the volume of domestic water between the top of tank 22 and overflow tube top 57 exceeds the volume of heat transfer liquid 50' in hollow section 50. As a result even if the domestic water becomes unpressurized when its surfaces drop to a level equivalent to top 57, it will have flushed all the heat transfer liquid outwardly through overflow tube 55. As a secondary benefit only the above described volume of domestic water will become wasted.

DESCRIPTION OF A SECOND EMBODIMENT

Figure 4:
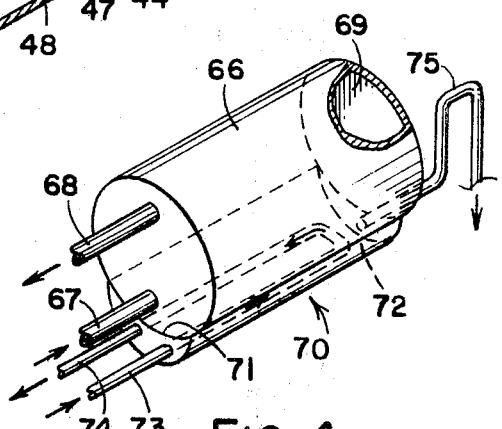

Referring now to FIG. 4, a domestic water tank 66 is shown for receiving domestic water through an inlet line 67 and discharging domestic water through a higher exit line 68. Tank 66 defines an enlarged cavity 69 which together with lines 67 and 68 constitute a segment of the main domestic water flow circuit. Rather than being inserted into tank 66, like unit 23 is inserted into tank 22 as shown in FIG. 3, a heat exchange unit 70 is fixed along an outside wall portion 71 of tank 66. Heat exchange unit 70 which is crescent shaped in cross section defines a hollow section 72 for containing nontoxic heat transfer liquid. Radiator water is forced through an inlet tube 73 and exit tube 74 during which time it is cooled and indirectly heats the domestic water. An overflow tube 75 extends from unit 70 and functions in a manner identical with that of overflow tube 55 shown in FIG. 3.

OPERATION OF THE SECOND EMBODIMENT

Radiator water guided through lines 73 and 74 is circulated through heat exchange unit 70 to liberate heat to the heat transfer liquid. The heat transfer liquid in turn heats the domestic water through outside wall portion 71 so that hot domestic water will be available for human consumption and cleansing. Radiator water cooler than that entering heat exchange unit 70 is routed back to the vehicle engine to cool the engine in the usual manner. Leakages arising in the radiator water circuit or domestic water circuit adjacent heat exchange unit 70 will be detected in the same manner as described in conjunction with the embodiment illustrated in FIGS. 1, 2 and 3.

From the foregoing it will be evident that the present invention has provided a liquid heat exchange system in which all of the various advantages are fully realized.

What is claimed is:

1. A vehicle heat exchange system for simultaneously heating potable liquid from a potable liquid source and cooling radiator liquid circulating through the vehicle radiator circuit, the system comprising:
   (a) a tank for containing potable liquid, the tank having an inlet line and an exit line located above the inlet line so that heated potable liquid in the tank will rise towards the exit line;
   (b) a flow line for conducting potable liquid into the tank inlet line;
   (c) an elongated tube secured to and projecting into the tank, the elongated tube being coupled in heat exchange relationship with the tank;
   (d) a vehicle radiator flow line segment arranged to circulate radiator liquid through the elongated tube, the elongated tube being arranged to mutually separate the potable and radiator liquids;
   (e) a hollow section defined between the elongated tube and radiator flow line segment containing a nontoxic heat transfer liquid that surrounds a portion of the radiator flow line segment; and,
   (f) an overflow outlet connected to the elongated tube at a location outside of the tank so that if potable or radiator liquid leaks into said hollow section then liquid will become displaced through the overflow outlet enabling the leakage condition to be detected.

2. The structure according to claim 1, an overflow tube is connected to the overflow outlet, the overflow tube having a top section positioned sufficiently beneath the potable liquid exit line so that if potable liquid becomes unpressurized and the elongated tube ruptures, then the heat transfer liquid is prevented from flowing into the tank and backflowing through the potable liquid inlet line.

3. The structure according to claim 1, wherein the heat transfer liquid is less dense than water, and, the volume of water between the tank top and overflow tube top section exceeds the heat transfer liquid volume in the hollow section.

4. The structure according to claim 1, including a gas water heater installed in a wall of the tank that may be operated to heat potable water in the tank when the vehicle engine is not running.

References Cited

UNITED STATES PATENTS

| | | | |
|---|---|---|---|
| 2,669,435 | 2/1954 | Cord et al. | 165—70 X |
| 2,670,933 | 3/1954 | Bay | 165—51 X |
| 3,177,659 | 4/1965 | Berman | 122—7 X |
| 3,277,886 | 10/1966 | Ryals et al. | 126—350 X |

ROBERT A. O'LEARY, Primary Examiner

T. W. STREULE, Assistant Examiner